(12) United States Patent
Kheifets

(10) Patent No.: US 8,607,964 B2
(45) Date of Patent: Dec. 17, 2013

(54) ADJUSTABLE CONVEYOR CHUTE

(75) Inventor: Alexander Kheifets, Coquitlam (CA)

(73) Assignee: Fluor Technologies Corporation, Aliso Viejo, CA (US)

( * ) Notice: Subject to any disclaimer, the term of this patent is extended or adjusted under 35 U.S.C. 154(b) by 231 days.

(21) Appl. No.: 12/991,789

(22) PCT Filed: May 14, 2009

(86) PCT No.: PCT/US2009/043922
§ 371 (c)(1),
(2), (4) Date: Jan. 31, 2011

(87) PCT Pub. No.: WO2009/140476
PCT Pub. Date: Nov. 19, 2009

(65) Prior Publication Data
US 2011/0139578 A1 Jun. 16, 2011

Related U.S. Application Data

(60) Provisional application No. 61/053,287, filed on May 15, 2008.

(51) Int. Cl.
*B65G 47/19* (2006.01)
(52) U.S. Cl.
USPC .......... 198/534; 198/550.2; 198/562; 193/21; 193/32
(58) Field of Classification Search
USPC ......... 198/531, 532, 534, 550.2, 562; 193/21, 193/27, 32
See application file for complete search history.

(56) References Cited

U.S. PATENT DOCUMENTS

| 597,376 | A | * | 1/1898 | Krug | 198/538 |
|---|---|---|---|---|---|
| 610,690 | A | * | 9/1898 | Ryder | 222/502 |
| 1,133,436 | A | * | 3/1915 | Gramling | 182/49 |
| 1,251,735 | A | * | 1/1918 | Bannon et al. | 209/705 |
| 1,512,654 | A | * | 10/1924 | Troy | 193/27 |
| 1,546,435 | A | * | 7/1925 | Chase | 222/166 |
| 2,355,708 | A | * | 8/1944 | Delucchi et al. | 186/69 |
| 2,637,434 | A | * | 5/1953 | Harper | 222/55 |
| 3,258,142 | A | * | 6/1966 | Girardi | 414/508 |
| 3,960,225 | A | * | 6/1976 | Hyer et al. | 177/121 |
| 4,133,436 | A | * | 1/1979 | Dahm | 414/285 |
| 4,298,118 | A | * | 11/1981 | Cottrell | 198/382 |
| 4,405,049 | A | | 9/1983 | Deitz | |
| 4,420,073 | A | | 12/1983 | Hausler et al. | |
| 4,715,546 | A | | 12/1987 | Holming et al. | |
| 5,048,666 | A | * | 9/1991 | Huggins et al. | 198/431 |
| 5,048,674 | A | * | 9/1991 | Wilbur et al. | 198/836.2 |
| 5,232,082 | A | * | 8/1993 | Bailey et al. | 198/502.2 |

(Continued)

FOREIGN PATENT DOCUMENTS

| GB | 738785 | 10/1955 |
|---|---|---|
| GB | 1569918 | 6/1980 |

*Primary Examiner* — Gene Crawford
*Assistant Examiner* — Keith R Campbell
(74) *Attorney, Agent, or Firm* — Fish & Associates, PC

(57) ABSTRACT

A conveyor assembly has a supply source from which a plurality of rolling objects is delivered to a conveyor belt, wherein the conveyor assembly is also configured such that the horizontal velocity of the rolling objects delivered to the conveyor belt is substantially the same as the horizontal velocity of the conveyor belt. Such configuration advantageously reduces, or even eliminates undesired movement of the objects on the conveyor belt and thus significantly improves quantification of the objects on the conveyor belt.

15 Claims, 1 Drawing Sheet

(56) References Cited

U.S. PATENT DOCUMENTS

| | | |
|---|---|---|
| 5,244,100 A | 9/1993 | Regier et al. |
| 6,564,927 B2 * | 5/2003 | Meyer ............................ 198/528 |
| 6,640,158 B1 * | 10/2003 | Brandt, Jr. .................... 700/240 |
| 6,874,615 B2 | 4/2005 | Fallas |
| 7,641,043 B2 * | 1/2010 | Vestergaard .................. 198/592 |
| 7,681,712 B2 * | 3/2010 | Hara et al. .................. 198/461.1 |
| 2005/0027393 A1 | 2/2005 | Tew et al. |

\* cited by examiner

ADJUSTABLE CONVEYOR CHUTE

This application claims priority to our U.S. provisional application with the Ser. No. 61/053,287, which was filed May 15, 2008.

FIELD OF THE INVENTION

The field of the invention is conveyor assemblies, especially as it relates to transport and weight measurement of rolling objects along conveyors.

BACKGROUND OF THE INVENTION

Conveyor belts are commonly found in various industrial facilities and move objects of various shapes and weights along predetermined transport paths. In cases where objects are prone to rolling (e.g., grinding balls supplied to a grinding ball mill(s) via a conveyor), the transport path is typically horizontal.

While such configurations are conceptually very simple, various problems may arise in practice, particularly where the objects are prone to movement. For example, where grinding balls are discharged from a conveyor or storage unit through a chute onto a lower second conveyor that includes a weighing scale (typically located under the conveyor to monitor the weight of balls supplied to the grinding ball mill per unit time), the grinding balls often keep rolling on the second conveyor, causing the scale to malfunction or to provide inaccurate measurement. Where objects do not have a tendency to move or roll, an intermediate conveyor with adjustable belt velocity can be implemented such as to control vertical and horizontal speed of packets or mail items as described in U.S. Pat. No. 6,874,615. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply. Unfortunately, intermediate conveyors are generally not effective for objects that have tendency to move or roll.

Other known mechanisms to overcome difficulties associated with variable feed rates of material that is fed to a conveyor belt with weighing mechanisms are described in GB 0 738 785 and GB 1 569 918. However, while such mechanisms often help overcome uneven distribution of certain materials on a conveyor belt, they once more fail to solve difficulties associated with materials that have a tendency to roll on the belt onto which they have been deposited.

Thus, there is still a need for improved material flow control in conveyor belt systems, especially where materials are prone to movement or rolling upon delivery from a delivery chute or conveyor belt having a vertical offset.

SUMMARY OF THE INVENTION

The present invention is directed to various devices and methods of conveyor systems in which a plurality of rolling objects are conveyed to a conveyor belt such that the horizontal velocity of the rolling objects is substantially the same as the horizontal velocity of the conveyor belt. Thus, undesirable movement of the rolling objects on the conveyor belt is reduced or even entirely eliminated, which significantly improves quantification of the rolling objects on the moving conveyor belt.

In one aspect of the inventive subject matter, a method of quantifying a plurality of rolling objects (e.g., grinding balls) on a conveyor belt includes a step of supplying the rolling objects at a first horizontal velocity from a supply source (e.g., storage vessel or a second conveyor belt) to the conveyor belt and a further step of operating the conveyor belt at a second horizontal velocity that is substantially the same as the first horizontal velocity. In yet another step, one or more parameters (e.g., weight, shape, size, color, etc.) of the rolling objects are quantified on the conveyor belt at the second horizontal velocity.

In preferred aspects, the step of supplying is performed by feeding the rolling objects through a conduit that has an adjustable portion, wherein adjustment (e.g., changing an angle of the adjustable portion relative to the conveyor belt) of the adjustable portion changes the first horizontal velocity. It is further preferred that operating the conveyor belt at the second horizontal velocity that is substantially the same as the first horizontal velocity is achieved by adjusting the first horizontal velocity to the second horizontal velocity or by adjusting the second horizontal velocity to the first horizontal velocity.

Contemplated methods may further comprise a step of reducing a vertical velocity of the plurality of rolling objects while supplying the plurality of rolling objects to the conveyor belt, and it is typically preferred that the step of quantifying comprises weighing the plurality of rolling objects on a belt scale that is coupled to the conveyor belt and/or comprises image analysis of the plurality of rolling objects on the conveyor belt.

Thus, and viewed from a different perspective, a method of supplying a plurality of rolling objects to a belt conveyor having a conveyor belt is contemplated in which a supply source (e.g., storage vessel or a second conveyor belt that is disposed at a vertical distance above the conveyor belt) that has a conduit is positioned to allow delivery of rolling objects at a first horizontal velocity from the supply source to the conveyor belt. The belt conveyor is then operated such that the conveyor belt has a second horizontal velocity, and first and second horizontal velocities are adjusted such that the first and second horizontal velocities are substantially the same.

Most typically, the step of adjusting comprises adjusting the first horizontal velocity via an adjustable element coupled to at least one of the supply source and the conduit. Also, it is generally preferred that an additional step of quantifying is performed (e.g., weighing or image analysis) while the plurality of rolling objects are on the conveyor belt at the second horizontal velocity.

Consequently, the inventor also contemplates a conveyor assembly that includes a supply source (e.g., storage vessel or a second conveyor belt that is disposed at a vertical distance above the conveyor belt) that has an adjustable portion and that is positioned relative to a conveyor belt such as to allow delivery of a plurality of rolling objects at a first horizontal velocity from the supply source to a conveyor belt of a belt conveyor. Most preferably, the conveyor belt is operable at a second horizontal velocity, and the adjustable portion is configured to allow adjustment of the first horizontal velocity of the rolling objects to be substantially identical to the second horizontal velocity.

In particularly preferred aspects, the adjustable portion comprises a ramp that is coupled to the supply source and/or the conduit in a manner such as to allow adjustment of an angle formed between the ramp and the conveyor belt. Moreover, it is typically preferred that the assembly further comprises a quantification device (e.g., weighing device or an image acquisition device) that is operationally coupled to the conveyor belt.

Various objects, features, aspects and advantages of the present invention will become more apparent from the following detailed description of preferred embodiments of the invention.

DETAILED DESCRIPTION

The invention is directed to various configurations and methods related to conveyor assemblies in which the horizontal velocity of rolling objects delivered to a conveyor belt is controlled to match the horizontal velocity of the conveyor belt delivery. Such configurations and methods advantageously reduce or even eliminate undesirable movement (e.g., clustering or random rolling) of the rolling objects on the conveyor belt, which in turn allows for improved accuracy of quantification of the objects on the moving conveyor belt.

In especially preferred aspects, a conveyor assembly will include a supply source that has an adjustable portion, wherein the supply source is positioned relative to a conveyor belt such as to allow delivery of a plurality of rolling objects at a first horizontal velocity from the supply source to the conveyor belt. Most typically, the conveyor belt in such assemblies operates at a second horizontal velocity, and the adjustable portion is configured to allow adjustment of the first horizontal velocity of the rolling objects to be substantially identical to the second horizontal velocity. The term "substantially identical" as used in conjunction with velocities herein means that the deviation between the velocities is less than +/−15%, more typically less than +/−10%, and most typically less than +/−5%. As also used herein, the term "rolling object" refers to an object that will change its position and/or placement in a rolling or tumbling (and in some cases also sliding) motion over a flat steel surface in response to tilting the surface from a horizontal position to an angle of 15 degrees or less, more typically an angle of 10 degrees or less, and most typically an angle of 7 degrees or less.

For example, particularly suitable conveyor assemblies include a storage vessel and/or second conveyor belt which are positioned at a vertical offset relative to each other. Most typically, an adjustable chute is also included that allows delivery of multiple rolling objects from the storage vessel and/or second conveyor belt to a lower conveyor belt at a desired and predetermined controlled horizontal velocity. Among other alternative options, the chute may terminate with a movable (typically tiltable) discharge portion that is adjustable such that the predetermined controlled horizontal velocity is substantially identical with the horizontal velocity of the lower conveyor belt to so eliminate or reduce movement of the rolling objects on the lower belt. It is still further especially preferred that the lower belt comprises or is operationally coupled to a weighing device or image analysis device to so allow quantification of a (typically physical) parameter of the rolling objects while the objects are disposed on the moving lower conveyor belt.

Figure 1:
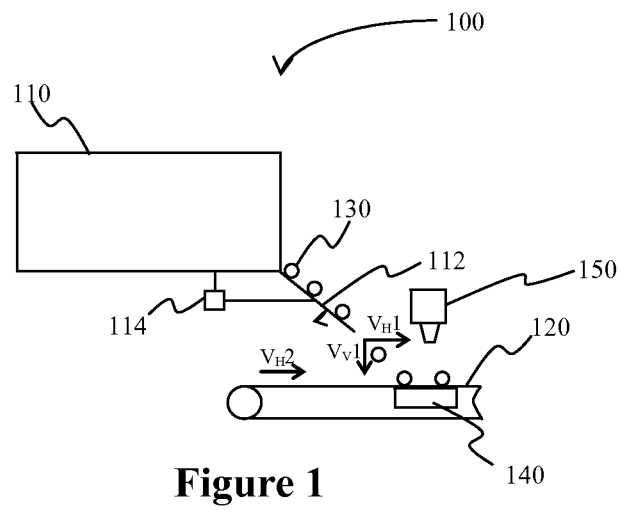
FIG. 1 is a schematic illustration of one exemplary conveyor system according to the inventive subject matter.

FIG. 1 schematically illustrates one exemplary conveyor assembly 100 in which supply source 110 is positioned above the conveyor belt 120. An adjustable portion 112 is coupled to the supply source 110 and serves as a conduit to allow delivery of the plurality of rolling objects 130. Where desired, the angle (relative to an imaginary horizontal plane) of the adjustable portion 112 is adjustable via an automated control device 114. Coupled to the conveyor belt 120 is a belt scale 140 that acts as a first quantification device and an image analysis system 150 that acts as the second quantification device. It is generally preferred that the adjustable portion 112 is positioned and adjusted such that the horizontal velocity $V_H 1$ of the rolling objects that leave the adjustable portion 112 is substantially identical with the horizontal velocity $V_H 2$ of the conveyor belt 120. As the rolling objects leave the adjustable portion 112, they will have a vertical velocity $V_V 1$.

Figure 2:
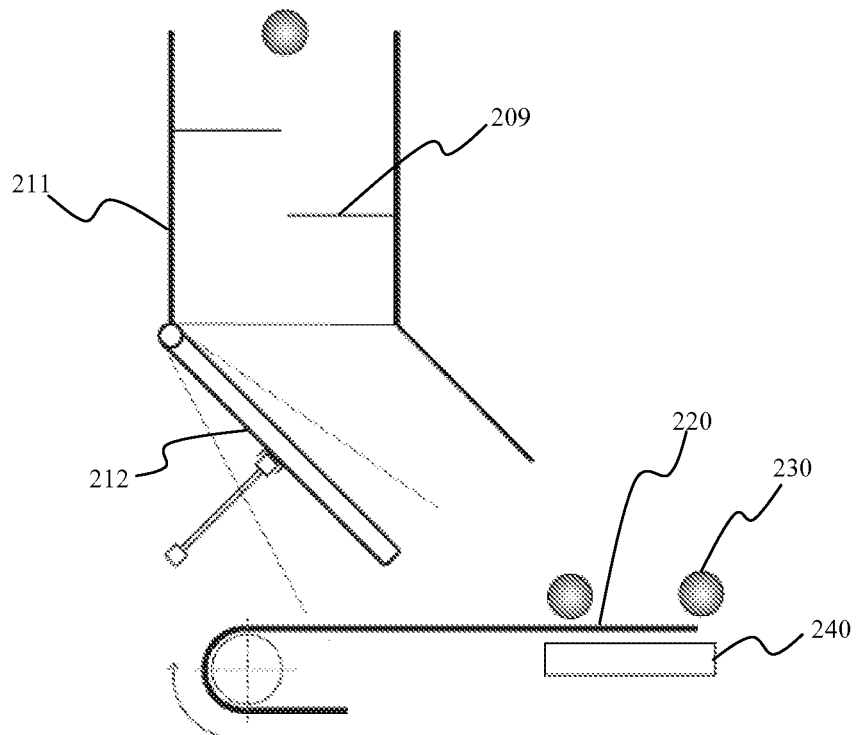
FIG. 2 is a schematic detail view of another exemplary conveyor system according to the inventive subject matter.

If desired, and as shown in more detail in FIG. 2, the vertical velocity may be reduced using damper elements 209. Here, a conduit 211 is coupled to (or part of) the supply source (not shown) and comprises an adjustable portion 212 (here: via adjustment of the angle) that provides control over the horizontal velocity of the rolling objects 230 on the conveyor belt 220. The quantification device in FIG. 2 is a belt scale 240 that is operationally coupled to the conveyor belt 220. Most typically, preferred adjustable chutes, especially if they are tall, may further include a damper and/or cushion just prior to the discharge chute to reduce the rolling objects' vertical speed, which will advantageously reduce bouncing movement of the rolling objects on the conveyor belt. Viewed from a different perspective, it is generally preferred that the adjustable discharge chute comprises a hinged or otherwise movable bottom portion to allow adjustment of the angle of object discharge for control of the horizontal speed of the object (e.g., such that the horizontal speed of the object is identical to the conveyor belt speed).

Among other advantages it should be appreciated that the rolling objects will come almost immediately to a stop on the conveyor belt downstream of the supply source and/or discharge chute. Thus a quantification device (e.g., belt scale or optical image analyzer) can be positioned in close proximity to the point of feeding of the rolling objects onto the conveyor belt. Consequently, it should be appreciated that a method of quantifying a plurality of rolling objects on a conveyor belt may include a step of supplying the plurality of rolling objects at a first horizontal velocity from a supply source to the conveyor belt. Such methods will include a further step of operating the conveyor belt at a second horizontal velocity that is substantially the same as the first horizontal velocity, and yet another step of quantifying the plurality of rolling objects on the conveyor belt at the second horizontal velocity.

Viewed from a different perspective, a method is contemplated in which a plurality of rolling objects is supplied to a belt conveyor having a conveyor belt. In such methods, a supply source is positioned relative to the conveyor belt such as to allow delivery of the rolling objects at a first horizontal velocity from the supply source to the conveyor belt, and the belt conveyor is operated such that the conveyor belt has a second horizontal velocity. First and second horizontal velocities are then adjusted relative to each other such that the first and second horizontal velocities are substantially the same. Such adjustment will essentially eliminate all or almost all of the difficulties associated with quantification of rolling objects on a conveyor belt.

Therefore, it should be recognized that delivery of rolling objects from a supply source at a controlled horizontal speed not only solves the problem of inaccurate weight measurement on a belt scale, but also allows for positioning of the rolling objects on the conveyor belt to facilitate optical counting. Thus, it should be noted that configurations and methods according to the inventive subject matter will tend to separate rolling objects and reduce cluster formation. Among other uses, such configurations are suitable for delivery of grinding balls for ball mills in the mining industries, particularly where a weigh scale and/or optical counter are employed.

In alternative aspects of the inventive subject matter, it should be appreciated that the adjustable portion of the supply source or conduit may be configured such that more than one adjustable portion is present, or that the entire portion or conduit may be configured to allow a change in discharge angle. For example, suitable adjustable portions may be configured as tiltable chutes that may be segmented to adjust the chute angle, rigid or flexible pipes that may be entirely flexible or flexible only in part, or as drop shafts that include an adjustable outlet portion similar to that of FIG. 2. Consequently, the particular nature of the actuator that controls the adjustable portion may vary considerably and may be electric, pneumatic, and/or may include a manual mechanism (e.g., using gears, screws, or preset angles). In especially preferred actuator configurations, a feedback mechanism may be implemented that allows adjustment of the adjustable portion in response to a sensed signal. For example, where the quantification device is a belt scale or other weighing implement, an increase in standard deviation or variance of consecutively measured weight data (or other statistical method sensitive to fluctuations in results that would otherwise be expected constant or linear in change) may be used to change the horizontal velocity of the conveyor belt and/or rolling objects. Alternatively, where the quantification device is an image analysis system, the adjustable portion or conveyor belt velocity may be changed in response to increased grouping of the rolling objects. Such automated adjustment may be continuous, or may employ a plurality of preset adjustments (e.g., limited to only certain chute angles).

Furthermore, the adjustable element need not be limited to those in which an angle is modified to so influence the horizontal velocity of the rolling objects. For example, where the angle of the adjustable portion or conduit is kept constant, at least a portion of the adjustable portion or conduit may include a resistor element that is configured to slow down flow of the rolling elements in the chute. For example, suitable resistor elements may include flexible fingers or other protrusions extending into the flow path, channels that force the flow of the moving elements into a side-to-side motion, or even a stream of a (e.g., compressed) fluid that reduces or increases horizontal speed.

With respect to suitable conveyor belts, it should be appreciated that it is generally preferred that the belts are typically in a substantially (i.e., +/−5 degree) horizontal position. However, embodiments are also contemplated in which the conveyor belt has an angle relative to an imaginary horizontal plane. Furthermore, while all known conveyor belts are deemed suitable for use herein, it is especially preferred that the conveyor belts are configured to allow weight measurements (e.g., via load cells, friction sensors, etc.) as the belt is moving at its horizontal velocity. Moreover, it is also contemplated that the conveyor belt may include dampening material that will reduce the impact of the rolling objects on the belt and/or that will increase friction (or produce otherwise resistance to rolling). For example, suitable belts may be coated or comprise a material into which the rolling object will at least partially sink (e.g., at least 10% of radius or longest distance between center of gravity and surface of the object) by virtue of their weight.

Thus, specific embodiments and applications of adjustable conveyor chutes have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification and/or claims refer to at least one of something selected from the group consisting of A, B, C . . . and N, the text should be interpreted as requiring only one element from the group, not A plus N, or B plus N, etc.

What is claimed is:

1. A method of quantifying a plurality of rolling objects on a conveyor belt, the method comprising:
supplying the plurality of rolling objects at an adjustable first horizontal velocity from a supply source to the conveyor belt by feeding the plurality of rolling objects through a conduit that has an adjustable portion, wherein the supply source comprises a chute, a hopper, or a second conveyor belt, wherein changing an angle of the adjustable portion relative to the conveyor belt changes the first horizontal velocity;
adjusting the first horizontal velocity and operating the conveyor belt at a second horizontal velocity that is substantially the same as the adjusted first horizontal velocity; and
quantifying the plurality of rolling objects on the conveyor belt at the second horizontal velocity.

2. The method of claim 1 wherein the step of operating the conveyor belt at the second horizontal velocity that is substantially the same as the first horizontal velocity is achieved by adjusting the first horizontal velocity to the second horizontal velocity.

3. The method of claim 1 wherein the step of operating the conveyor belt at the second horizontal velocity that is substantially the same as the first horizontal velocity is achieved by adjusting the second horizontal velocity to the first horizontal velocity.

4. The method of claim 1 further comprising a step of reducing a vertical velocity of the plurality of rolling objects while supplying the plurality of rolling objects to the conveyor belt.

5. The method of claim 1 wherein the step of quantifying comprises weighing the plurality of rolling objects on a belt scale that is coupled to the conveyor belt.

6. The method of claim 1 wherein the step of quantifying comprises image analysis of the plurality of rolling objects on the conveyor belt.

7. The method of claim 1 wherein the plurality of rolling objects are grinding balls and wherein the step of quantifying comprises weighing the plurality of rolling objects on a belt scale.

8. The method of claim 1 wherein the supply source is a storage vessel or a second conveyor belt that is disposed at a vertical distance above the conveyor belt.

9. A method of reducing clustering or random rolling of a plurality of rolling objects on a belt conveyor having a conveyor belt, comprising:
positioning a supply source relative to the conveyor belt to thereby allow delivery of the plurality of rolling objects at an adjustable first horizontal velocity from the supply source to the conveyor belt via an adjustable portion, wherein the adjustable portion comprises a ramp that is coupled to the supply source in a manner to thereby allow adjustment of an angle formed between the adjustable portion and the conveyor belt;

operating the belt conveyor such that the conveyor belt has a second horizontal velocity; and adjusting the first horizontal velocity by adjusting the angle formed between the adjustable portion and the conveyor belt such that the first and second horizontal velocities are substantially the same.

10. The method of claim 9 wherein the supply source is a storage vessel or a second conveyor belt that is disposed at a vertical distance above the conveyor belt.

11. The method of claim 9 further comprising a step of quantifying the plurality of rolling objects on the conveyor belt at the second horizontal velocity.

12. The method of claim 11 wherein the step of quantifying the plurality of rolling objects comprises at least one of weighing and image analysis.

13. A conveyor assembly comprising:
   a supply source having an adjustable portion, wherein the supply source is positioned relative to a conveyor belt to thereby allow delivery of a plurality of rolling objects at an adjustable first horizontal velocity from the supply source to the conveyor belt;
   wherein the adjustable portion comprises a ramp that is coupled to the supply source in a manner to thereby allow adjustment of an angle formed between the adjustable portion and the conveyor belt;
   wherein the conveyor belt is operable at a second horizontal velocity;
   wherein the adjustable portion is configured to allow adjustment of the first horizontal velocity of the rolling objects to be substantially identical to the second horizontal velocity; and
   a quantification device that is operationally coupled to the conveyor belt.

14. The conveyor assembly of claim 13 wherein the quantification device is a weighing device or an image acquisition device.

15. The conveyor assembly of claim 13 wherein the supply source is a storage vessel or a second conveyor belt that is disposed at a vertical distance above the conveyor belt.

* * * * *